United States Patent [19]

Deering et al.

[11] Patent Number: 5,660,527

[45] Date of Patent: Aug. 26, 1997

[54] WIND TURBINE ROTOR BLADE ROOT END

[75] Inventors: Kenneth J. Deering, Seattle; Thomas Knapp, Renton, both of Wash.

[73] Assignee: The Wind Turbine Company, Bellevue, Wash.

[21] Appl. No.: 539,433

[22] Filed: Oct. 5, 1995

[51] Int. Cl.⁶ .................................................. B63H 1/20
[52] U.S. Cl. ...................... 416/205; 416/204 R; 416/209
[58] Field of Search ............................... 416/204 R, 205, 416/209, 210 R, 211, 239

[56] References Cited

U.S. PATENT DOCUMENTS

| | | | |
|---|---|---|---|
| 1,806,385 | 5/1931 | Bramson | 416/205 |
| 2,270,542 | 1/1942 | Martin et al. | 416/204 R |
| 2,289,400 | 7/1942 | Woods . | |
| 2,427,166 | 9/1947 | Teeter et al. . | |
| 3,303,889 | 2/1967 | Bates . | |
| 4,161,658 | 7/1979 | Patrick . | |
| 4,201,514 | 5/1980 | Huetter . | |
| 4,305,699 | 12/1981 | Martinelli . | |
| 4,335,996 | 6/1982 | Ross . | |
| 4,348,156 | 9/1982 | Andrews . | |
| 4,412,784 | 11/1983 | Wackerle et al. . | |
| 4,449,889 | 5/1984 | Belden . | |
| 4,524,499 | 6/1985 | Grimes et al. . | |
| 4,584,486 | 4/1986 | Quynn . | |
| 4,728,263 | 3/1988 | Basso . | |
| 4,769,959 | 9/1988 | Lindsey . | |
| 5,173,023 | 12/1992 | Pawlowski et al. . | |
| 5,354,175 | 10/1994 | Coleman et al. . | |

FOREIGN PATENT DOCUMENTS

| | | | |
|---|---|---|---|
| 811726 | 4/1937 | France . | |
| 1270411 | 6/1968 | Germany | 416/205 |
| 4207019 | 8/1992 | Germany | 416/205 |
| 316487 | 4/1934 | Italy | 416/209 |
| 2 087 981 | 6/1982 | United Kingdom . | |

OTHER PUBLICATIONS

Aerpac advertisement, *Wind Power Monthly News Magazine*, vol. 11, No. 10, Oct. 1995, "Fasten Your T–Bolts!", p. 10.

Electric Power Research Institute, Project 1996–4, Final Report, United Technologies "WTS–4 Blade Construction", pp. 2–5.

"Enercon Flange Connection", Fig. 8, undated.

Garrad Hassan & Partners, "Investigation of Materials and Manufacturing Methods for Wind Turbine Blades", ETSU W/44/00261, 1993, Polymarin Blade Construction, Fig. 6.

Garrad Hassan & Partners, "Investigation of Materials and Manufacturing Methods for Wind Turbine Blades", ETSU W/44/00261, 1993, IKEA type root connection as used by Aeroconstruct, Fig. 7.

*Primary Examiner*—Edward K. Look
*Assistant Examiner*—Mark Sgantzos
*Attorney, Agent, or Firm*—Bogle & Gates P.L.L.C.

[57] ABSTRACT

A structure and method for transferring load, particularly bending load, from a blade to a blade hub, such as for use in a wind turbine device, is provided. In one embodiment, the structure includes two or more spaced-apart annular rings, respectively contacting the inner surface of a blade root end, and the outer surface of a hub spindle, with a web extending therebetween.

10 Claims, 9 Drawing Sheets

WIND TURBINE ROTOR BLADE ROOT END

The present invention relates to a configuration for a rotor blade and, in particular, to the root end design of a blade suitable for a wind turbine.

BACKGROUND INFORMATION

A wind turbine, like some other structures such as aircraft propellers, fans, and the like, includes blades configured for rotating about an axis. Typically, two or more blades are provided each coupled to a rotatable hub. A number of hub configurations can be used and a number of wind turbine designs can be used, including that described in U.S. Pat. application Ser. No. 08/360,310, filed Dec. 21, 1994, entitled Rotor Device and Control for Wind Turbine, incorporated herein by reference. In the course of operation, each blade transfers a load to the hub. This load has a number of components such as an axial component, a twist component, a bending component, and the like. For certain designs, the bending component of the load transferred from the blade to the hub has been particularly problematic. The bending component is the component in a direction substantially normal to the blade longitudinal axis. The difficulties of bending load transfer occur in many types of designs, but are especially acute in configurations where the blade and the hub have different compositions (such as a composite blade and a metallic hub).

One previous approach, depicted in FIG. 1, provides inner and outer steel rings 110, 112, coupled to the root end of the composite material blade 114, e.g., via an adhesive bond and/or precision diameter bolts 116 installed in match drilled radial holds around the perimeter. The structure is coupled to a hub via bolts 118 attached to threaded retention holes 120. It is believed that the bending load transfer mechanism in this design results principally in a shearing effect, at the interface between the concentric steel rings 110, 112 and the main structural spar 114 of the blade. To achieve a degree of reliability, this design involves providing high precision in the dimensions of the spar root end 114, particularly the inner and outer diameters thereof which, in a practical sense, limits the design of the root end to a circular cross section, since such high precision is difficult to achieve in other shapes such as, for example, elliptical sections. It is believed that, for at least some designs, if a high degree of precision is not achieved, the adhesive bond or other coupling of the root end of the blade to the rings may be (locally) faulty and loss of structural integrity could result.

FIG. 2 depicts, in cross section, a similar configuration with a cylindrical section composite blade root 214, bonded adhesively and coupled via pins 216 in an annular region defined by inner and outer steel annular plates 210, 212, with hub connection being achieved via bolts threaded through holes 220, in a flange 222. This design is believed also to rely principally on shear strength of the adhesively bonded joint and to involve a high degree of precision in the dimensions of the blade root 214, particularly the inner and outer diameters. The high precision involved in the designs depicted in FIGS. 1 and 2, is believed to add undesirably to the overall cost of the device.

Another previous configuration is depicted generally in FIG. 3. In this design, the root end of the blade 314 is compressed axially against a hub or hub extension 324, by a plurality of the steel studs or bolts 318, extending through axial holes 326, molded or machined into the blade root end, and engaging steel inserts or cylindrical shaped "barrel nuts" 316 positioned in radial holes formed in the root end 314. To effect a transfer of bending moment from the blade root end 314 to the hub or hub extension 324, this configuration is believed to lead to high localized contact stresses at the interface between the barrel nuts 316 and the surrounding blade root material. Such high localized stress may, it is believed, lead to local crushing of the blade material, potential loosening of the studs or bolts 318, and eventual loss of structural integrity. A modified version of the configuration of FIG. 3 involves embedding the studs 318 directly in the blade material. In this modification, high localized contact stresses are believed to occur between the stud thread surfaces and the composite material, similarly providing a risk of localized crushing of blade material and loss of structural integrity. It is believed that some previous designs, as a result of the potential for high localized stresses, have provided blades which are relatively large in diameter, and which have relatively thick or heavy wall sections throughout the root area, in order to accommodate such high local stresses.

Accordingly, it would be advantageous to provide for a blade design which achieves effective transfer of bending loads from the blade to the hub, while having a relatively lower cost, lower requirement for precision in the shape of the blade root end, greater opportunity for designs other than circular cross-section designs, reduction or elimination of high localized stresses, and ability to provide for blades with relatively small root and diameters and thinner wall sections in the root area.

SUMMARY OF THE INVENTION

According to the present invention, a structure is positioned in a hollow interior of the blade root end, which includes a first region contacting an interior surface of the blade root end, a second structure contacting a hub, hub extension or spindle, and a third structure extending between the first and second structures for transferring load. In one embodiment, the load transfer device includes a ring with an H-shaped radial cross section. In one embodiment, two or more such rings are provided axially spaced apart. Preferably, the load transfer structure is non-solid, defining substantial portions of the interior of the blade root end which are hollow (or filled with material of a lighter density than the density of the load transfer structure). The load transfer device is configured to transfer load in the absence of substantial concentration of stresses. In one embodiment, in response to a bending load on the blade, at least a first portion of the load transfer device is compressed in direction having a first radial component and, preferably, a second portion of the load transfer device is compressed in a direction having a component parallel and opposite to the first radial component.

3

Figure 6:
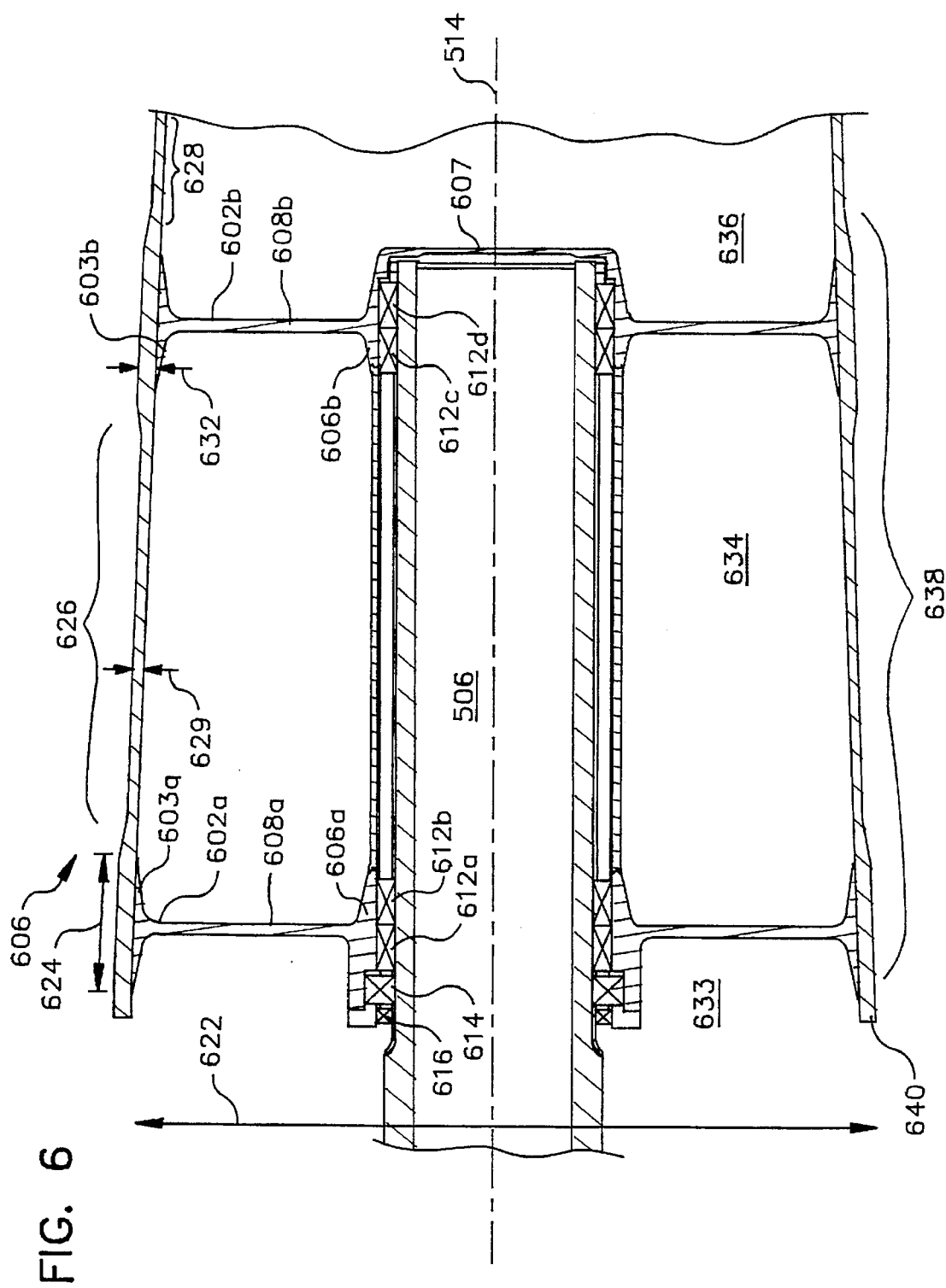
FIG. 6 is a partial cross section view of a blade root end, according to an embodiment of the present invention.
Figure 7:
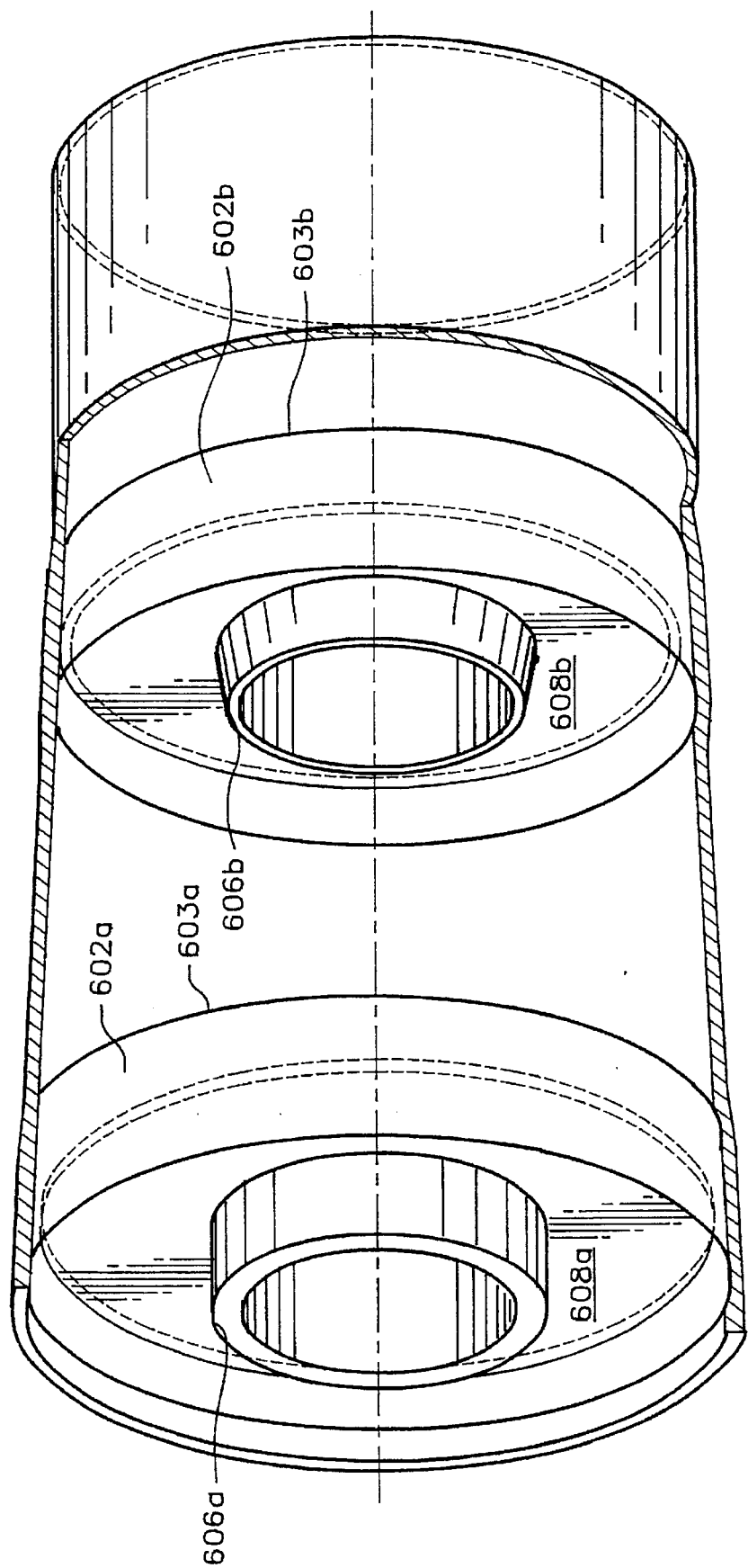
Figure 8:
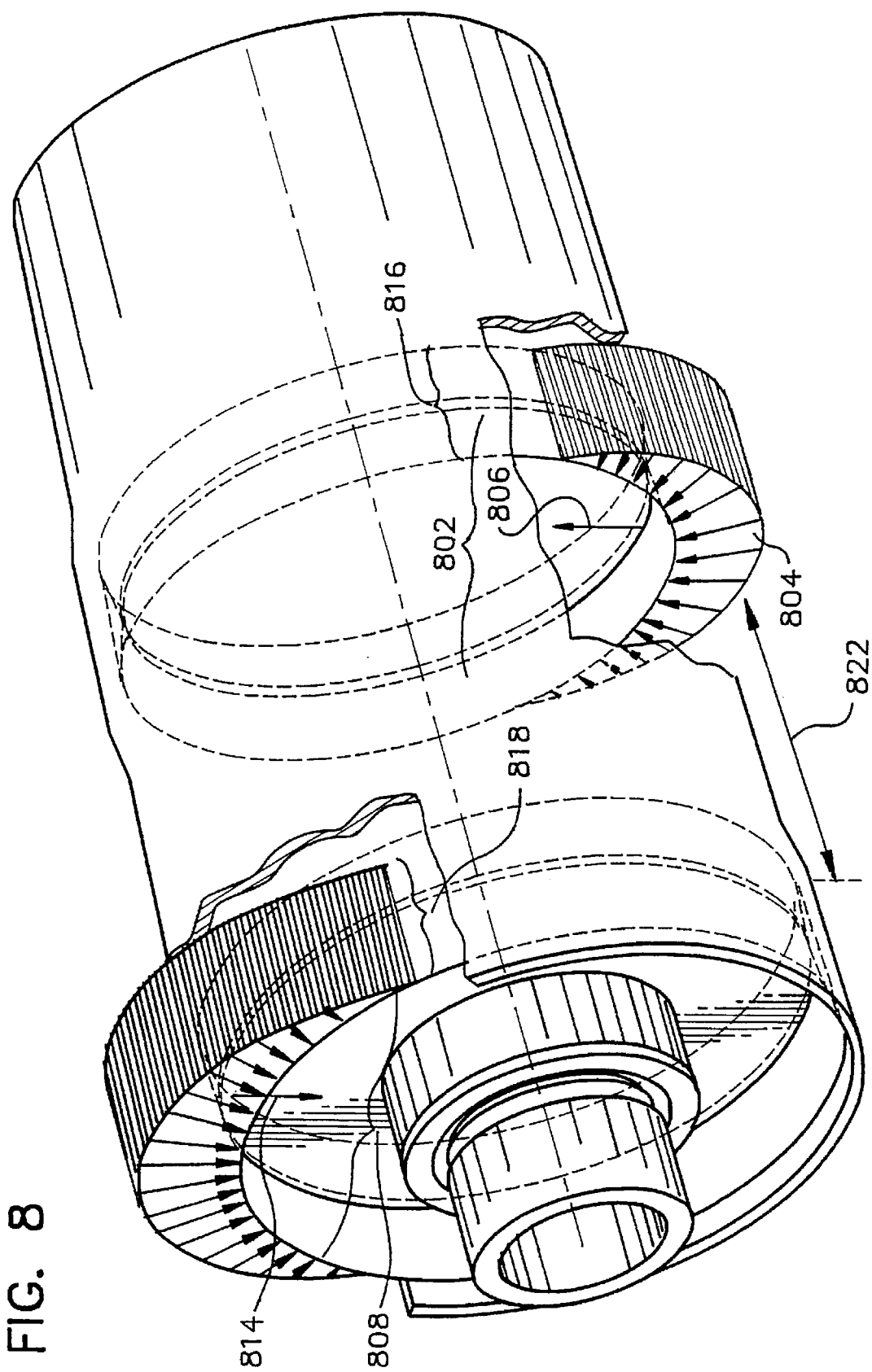
Figure 9A:
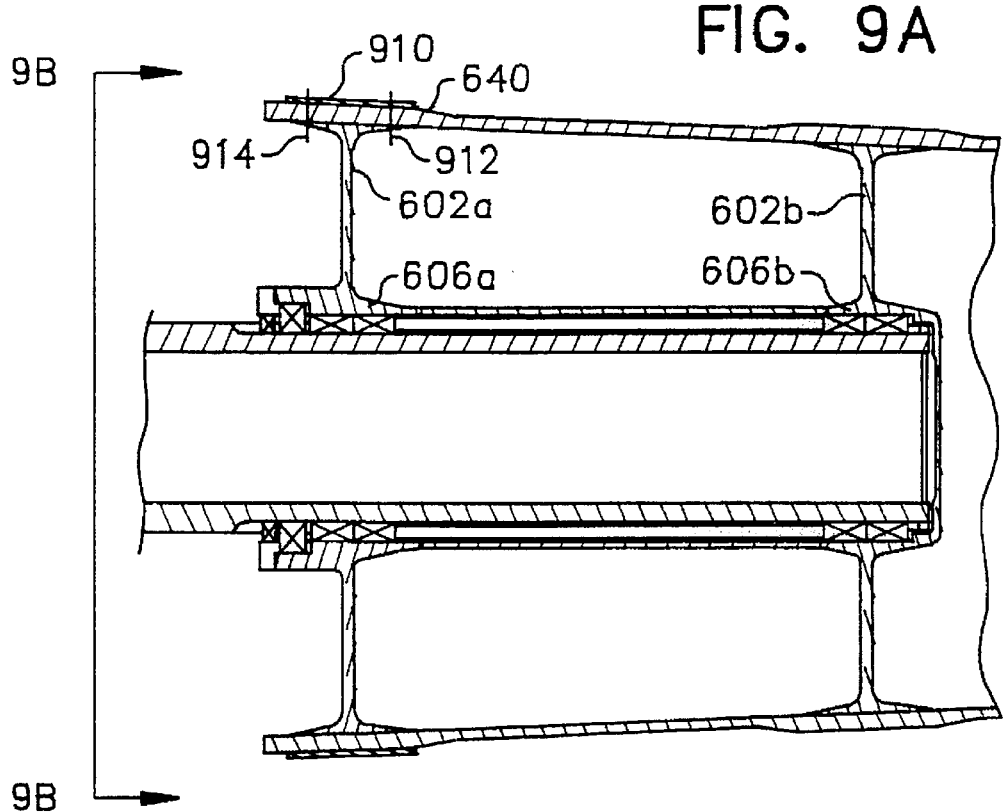
Figure 9B:
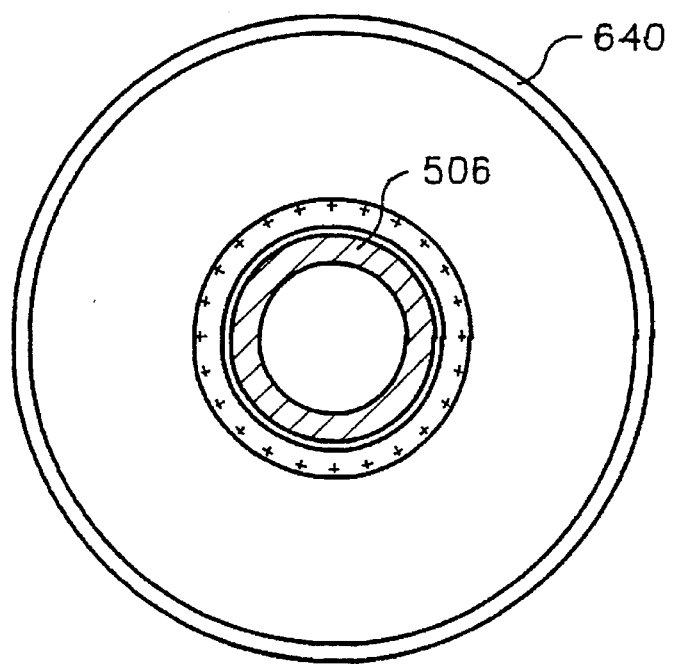
Figure 10A:
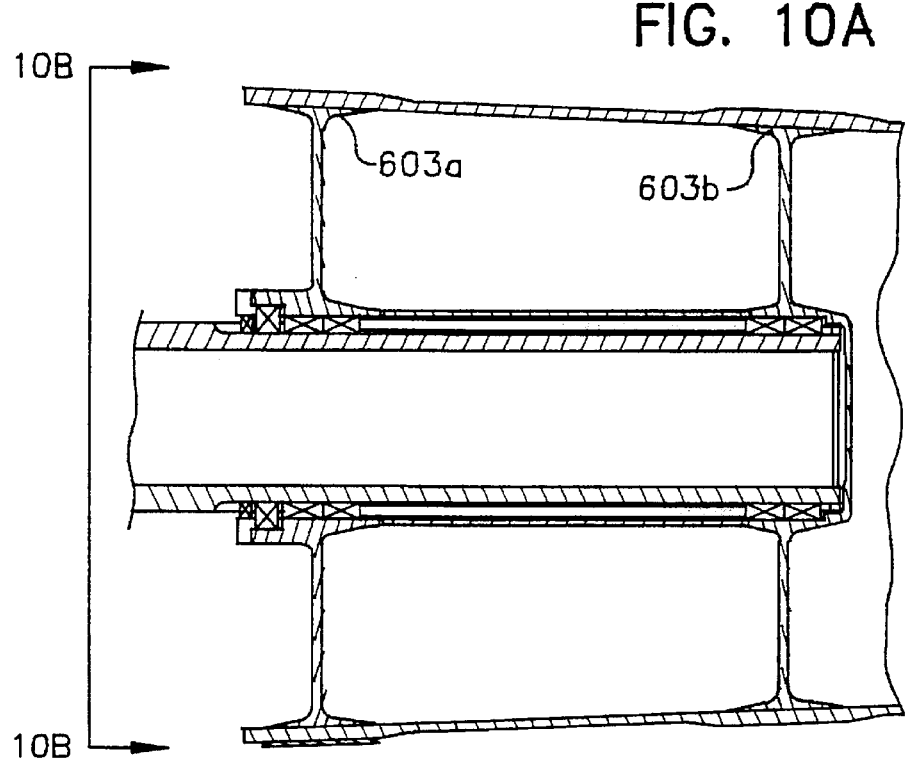
Figure 10B:
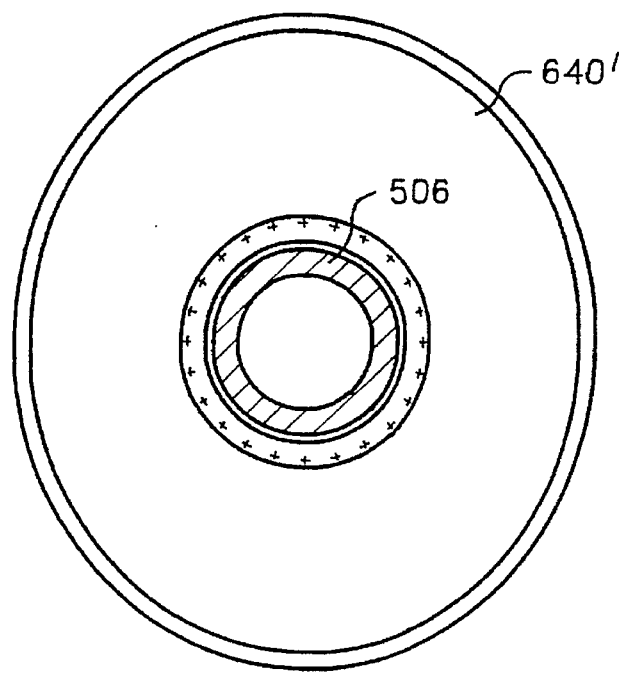
Figure 11:
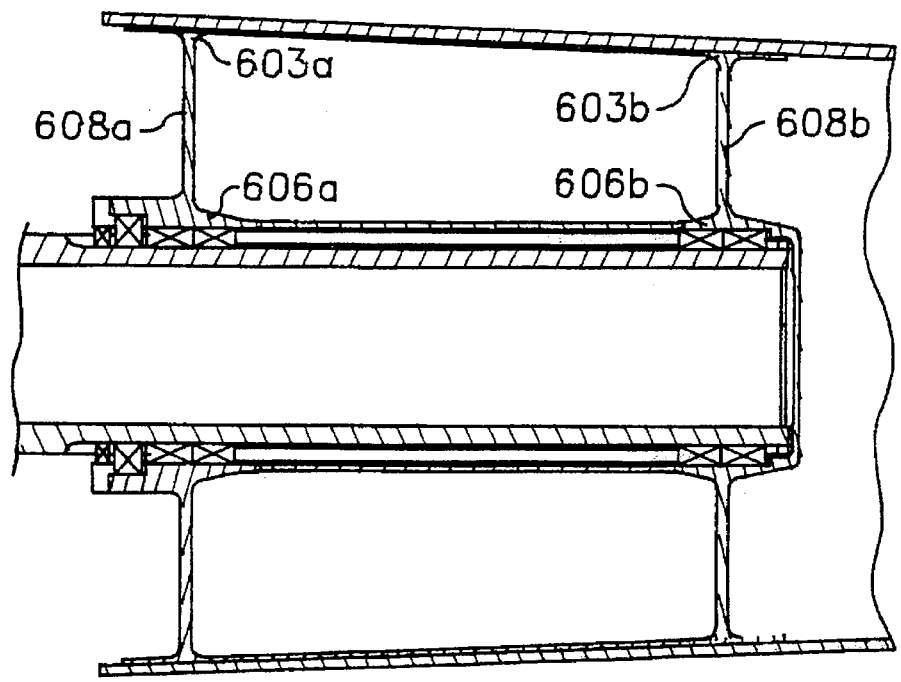
Figure 12A:
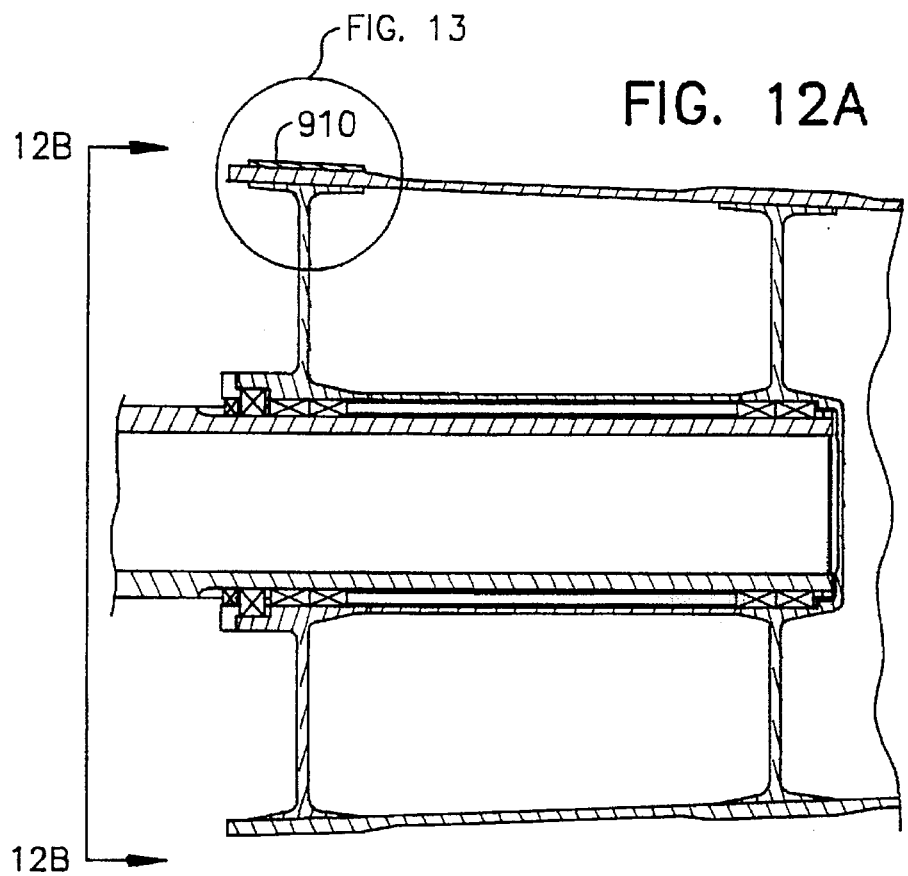
Figure 12B:
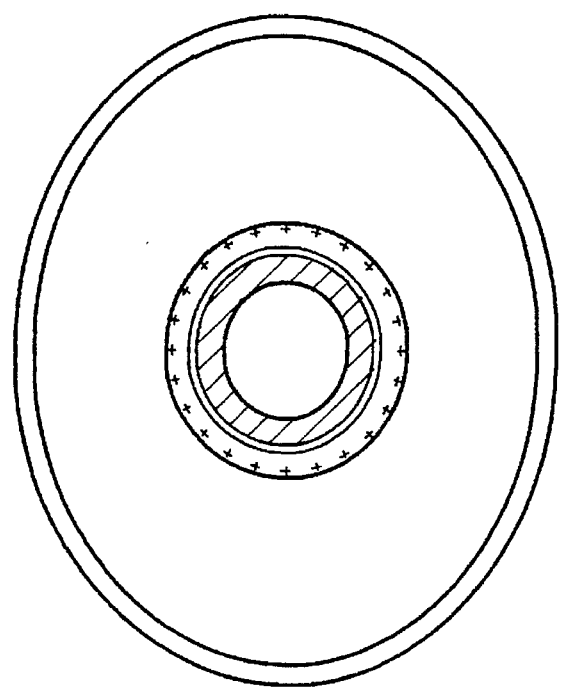

FIG. 7 is a partial perspective view, partially cut away, of a blade root end according to an embodiment of the present invention;

FIG. 8 is a schematic perspective view, partially cut away, of a blade root end depicting load transfer vectors, according to an embodiment of the present invention;

FIG. 9A is a partial cross-sectional view of a blade root end having a fastener ring according to an embodiment of the present invention;

FIG. 9B is a cross-sectional view taken along line 9b—9b of FIG. 9A;

FIG. 10A is a cross-sectional view similar to the view of FIG. 6 but showing a blade root having an elliptical section;

FIG. 10B is a cross-sectional view taken along line 10b—10b of FIG. 10A;

FIG. 11 is a cross-sectional view similar to the view of FIG. 6 but showing a 1-ring embodiment;

FIG. 12A is a cross-sectional view similar to that of FIG. 10A but including a fastener ring;

FIG. 12B is a cross-sectional view taken along line 12b—12b of FIG. 12A; and

Figure 13:
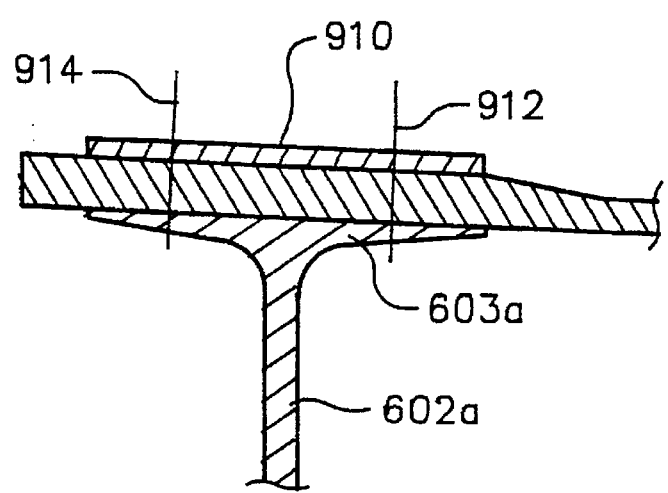

FIG. 13 is a detailed cross-section of region 13 of FIG. 12A.

DETAILED DESCRIPTION OF THE PREFERRED EMBODIMENTS

Figure 4:
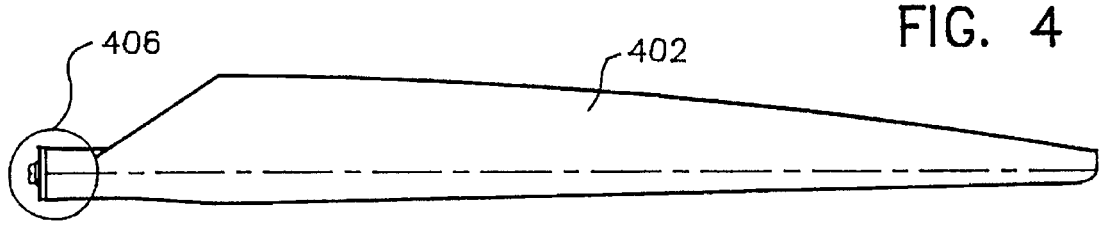
FIG. 4 is plan view of a turbine blade, according to an embodiment of the present invention.
Figure 3:
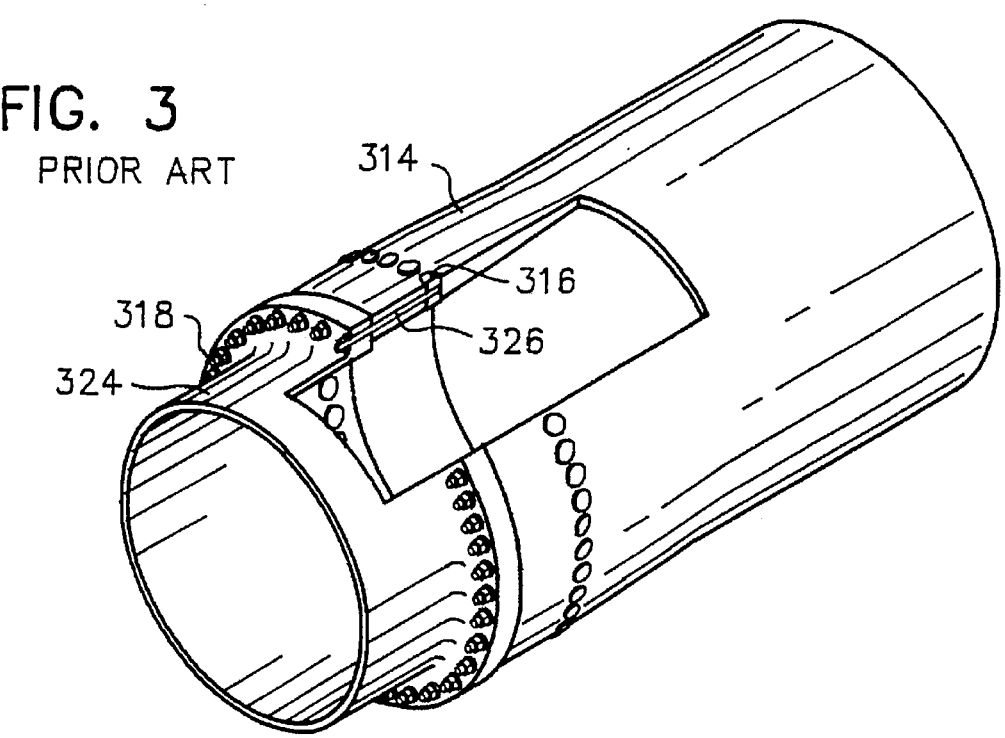
FIG. 3 is a perspective view, partially cut away, of a blade root end according to a previous device.

A rotatable blade such as a wind turbine blade can have a number of shapes and sizes. In the embodiment depicted in FIG. 4, the root end 406 of the blade 402 is configured to couple to a rotor hub, as described more thoroughly below. A number of materials can be used for the blade. In one embodiment, the blade 402 is made of a composite material such as a fiberglass reinforced plastic (GRP). The present invention can be used in connection with a number of types of blades, including fixed pitch blades and variable pitch blades.

Figure 5:
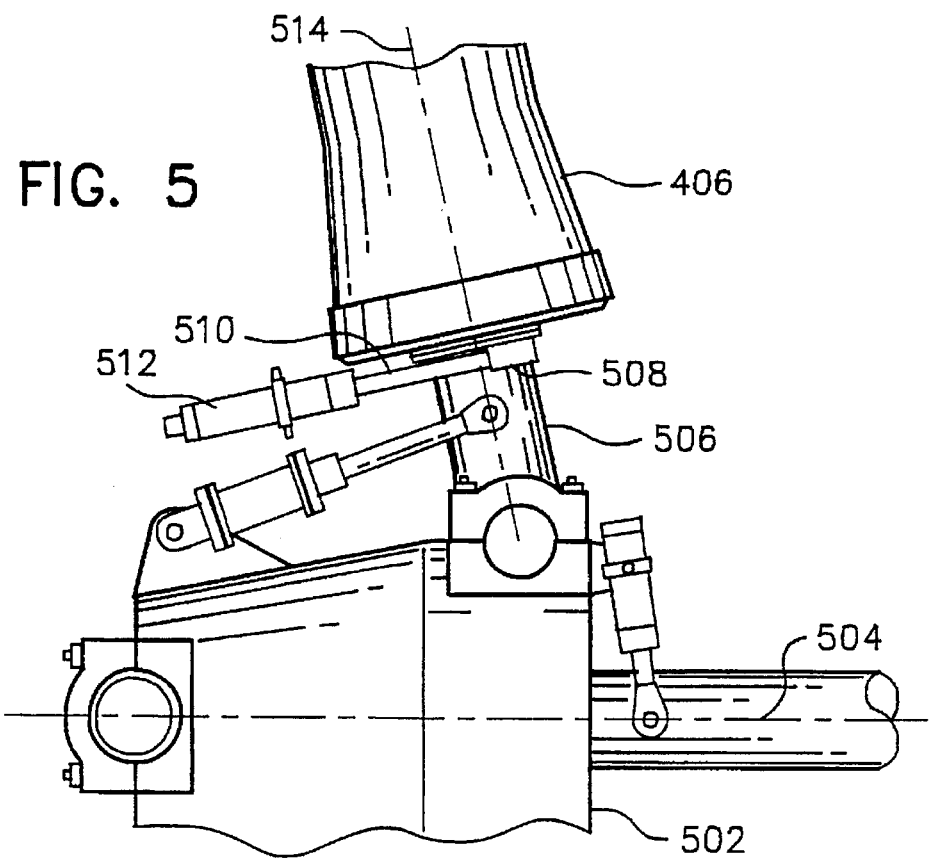
FIG. 5 is a partial side elevational view of a wind turbine hub, and an attached blade root end.

A hub configuration usable in connection with a variable pitch blade is depicted in FIG. 5. In the embodiment of FIG. 5, a hub 502 is coupled to a rotor for rotation about a rotation axis 504. A hub spindle 506 extends into the interior of a blade root end 406. In the depicted embodiment, a peripheral position of a blade root end 508 forms a crank arm for rotation via extension or retraction of an actuator arm 510 driven by an actuator 512, for rotating the blade about its longitudinal axis 514, changing the pitch thereof.

FIG. 6 depicts the interior of the blade root end 406, and its coupling to spindle 506. In the depicted embodiment, first and second rings 602a, 602b, are positioned coaxially with the spindle 506 and root end 406, and extending therebetween, as also seen in the embodiment depicted in FIG. 7. Although a number of configurations for the rings 602a, 602b are possible, in the depicted configuration each ring has an H-shaped radial cross-section, defining an outer collar 603a, 603b, an inner collar 606a, 606b, and a washer-shaped web 608a, 608b, extending therebetween. In the depicted embodiment, the upper ring includes a cap region 607, surmounting the distal end of spindle 506. The ring structures may be formed integrally, as shown for ring 602b, or may be formed from two or more parts coupled together by welding adhesives, and the like, as depicted for ring 602a. The rings 602a, 602b, may be made of a number of materials, and are preferably made of metal such as steel. Other materials that can be used for the rings include ceramics and composite materials. In the depicted embodiment, the interior of the blade root portion 406 has a

4 taper, and the rings 602a, 602b are configured to match the taper to provide a taper fit to the internal bore of the blade root section 406. In one embodiment the outer collars 603a, 603b, are coupled to the interior surface of the hollow blade root end 406 by an adhesive, such as an epoxy adhesive. In the depicted embodiment, the inner collars 606a, 606b, are coupled to the spindle 506 by bearings such as pitch bearings 612a, b, c, d and/or thrust bearing 614. If desired an 0-ring or other seal can be provided. Pitch bearings 612a, 612d allow the blade to rotate about its longitudinal axis 514, for changing the pitch of the blade. The depicted bearings and/or spindle configuration 506 can be modified or eliminated in other embodiments, such as fixed-pitch embodiments.

As depicted in FIG. 8, when the blade is subjected to a bending load, the load on the blade is transferred to the spindle by compressing the blade root against a first portion 802 of the first ring structure 602b, providing a contact pressure distribution depicted by vector arrows 804, having a vector sum in a first radial direction 806, and compressing against a second portion 808 of the second ring 602a, providing a contact pressure distribution having a vector sum 814 substantially parallel, but opposite in direction to the direction of load transfer 806 to the first ring 602b. As seen in FIG. 8, the pressure distribution arising from a bending load is distributed over a substantial and preferably substantially continuous region having both circumferential extent 802, 808, and axial extent 816, 818. Because the contact pressure is distributed over one or more substantial and preferably continuous regions, stress concentration is avoided. Preferably, the ring structures or other load distributing structures 602a, 602b, are configured with members 603a, 603b, which contact the inner surface of the blade over an area having an axial extent and contacting at least the majority of the inner circumference of the blade. Similarly, the inner collars 606a, 606b, contact a region of the spindle 506 surface, having an axial and circumferential extent to distribute pressure and/or stress over an area and avoid stress concentration. Preferably, the inner collar 606a, 606bbe coupled to at least a majority of the outer circumference of the spindle (via bearings 612), over a first axial extent.

Preferably, the load transfer device has an axial extent such that the axial distance 822 between the first and second contact pressure distribution vectors 806, 814 (822) is on the order of the maximum effective diameter 622 of the root end 406, such as being greater than about 0.1 times the diameter 622 and less than about 20 times the diameter 622, preferably greater than about 0.5 times the diameter and less than about five times the diameter, and more preferably about equal to the diameter 622 of the root end. The extent 624 of the outer collar 603a, 603b, is preferably a substantial portion of the root end diameter 622, such as being between about 10% and about 30% of the root end diameter 622, preferably about 20% of the root end diameter. In one embodiment, regions 626 between the load transfer device and/or region 628 axially distal of the load transfer devices 602a, 602b have a root end wall thickness 629 which is less than the thickness 632 of the walls adjacent the load transfer devices 602a, 602b. This thinning of regions spaced from the load transfer devices is advantageous since it is costly to produce thick-walled blades. By the present design, the contact pressure axial distribution is known, and thus it is possible to provide thinner blade walls in regions where pressure distribution will be less. In one embodiment, the wall thickness 632 adjacent the load transfer devices is between about 1.2 and about 2.0 times the thickness 629 elsewhere.

In the embodiment depicted in FIG. 9A, an annular fastener bearing ring 910 is positioned around the outer circumference of the blade root preferably aligned with one of the outer collars such as the lower out collar 603a of the load transfer device. In one embodiment, ring retention fasteners such as rivets, bolts or the like, extend along axis 912, 914 spaced around the circumference of the blade root for assisting in holding the load transfer device 602a in position. In the depicted embodiment, the inner collar regions 606a', 606b' are joined together to form a unitary structure.

The embodiment of FIGS. 10A and 10B are similar to that of FIG. 6 except that, as best seen in FIG. 10B, the cross-sectional shape of the blade root, and thus the cross-sectional shape of the outer collars, 603a, 603b is elliptical rather that circular. Because the load bearing structure of the present invention does not require high precision in the shape and dimensions of the blade root portion, it becomes practical to produce a blade root portion having non-circular cross-section at a reasonable cost.

The embodiment depicted in FIG. 11 is similar to that depicted in FIG. 6 except that the outer collars 603a, 603b and inner collars 606a, 606b are joined to form a single unitary structure so that the load transfer device in the embodiment of FIG. 11 is a single ring structure having two webs 608a, 608b extending between axially-extensive outer collar 603a, 603b and inner collar 606a, 606b.

Figure 1:
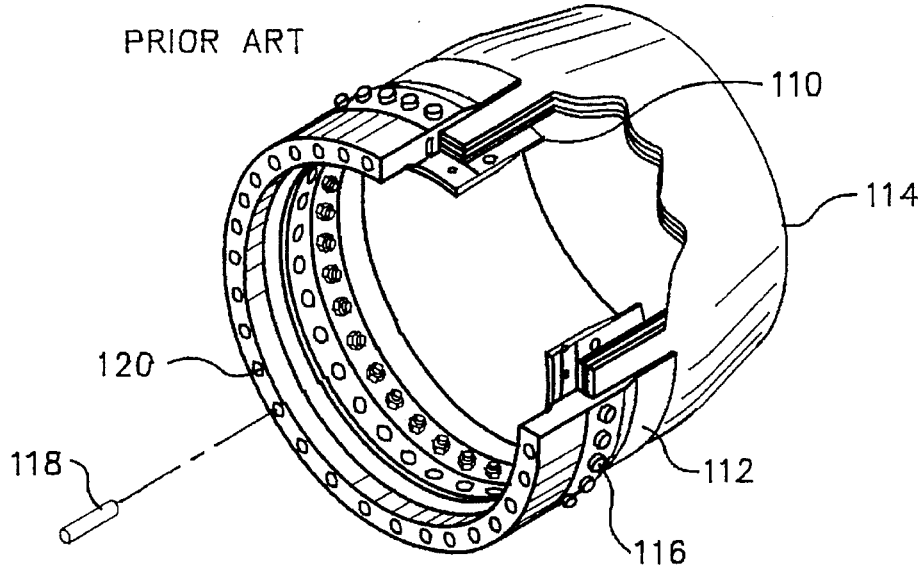
FIG. 1 is a perspective view, partially cut away, of a blade root end according to a previous device.
Figure 2:
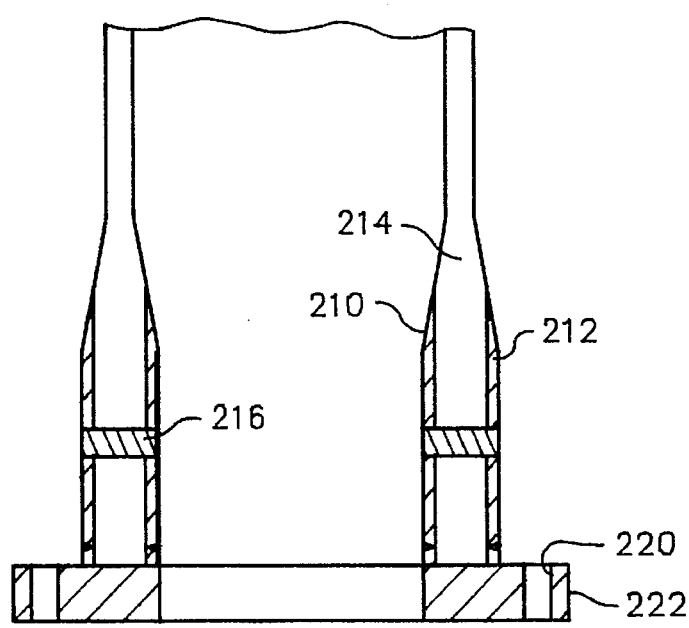
FIG. 2 is a cross-sectional view of a blade root end, according to a previous device.

The embodiment depicted in FIGS. 12A and 12B is similar to that depicted in FIGS. 10A and 10B except for the inclusion of a fastener-bearing ring 910 similar to that depicted in FIG. 9A. As shown in detail in FIG. 13 the fastener-bearing ring 910 is substantially aligned with the lower ring collar 603a and the opposed fastener-bearing ring 910 and outer collar 603a are used to support fasteners such as rivets, bolts, etc., positioned in holes formed along axis 912, 914, e.g. by drilling, to assist in holding the ring 602a in position. Although there is some superficial resemblance of the configuration of FIG. 13 with that of FIG. 1, the mechanical properties and load transfer properties are quite different since bending load in the embodiment of FIGS. 12A–12B and 13 are transferred radially inward in a compressive mode whereas bending stress in the embodiment of FIG. 1, as discussed above, is believed to principally result on shear stress in the embodiment of FIG. 1. Furthermore, in the embodiment of FIG. 1, there is no transfer of bending stress radially inward along two vectors which are axially spaced, parallel and opposite in direction.

In light of the above description, a number of advantages of the present invention can be seen. The present invention provides for transfer of bending load from a blade to a hub or hub extension, while minimizing the concentration of stresses, even in cases where the blade and hub or hub extension are substantially different in mechanical properties such as hardness. The load transfer device can be provided without extreme precision in the configuration of the blade root end geometry, and thus at a lower cost. Reduced-thickness of blade walls, at least over a portion of the blade structure, can be provided to reduce blade costs. The load transfer mechanism is one of low pressure contact stress, rather than either sheer stress or high-pressure contact stress. Bending loads are transferred from the blade material such as composite (GRP) blade root end, without encountering high local contact stress. There is no requirement for high precision dimensions or high precision fitting of mating parts. The blade root section may be circular in section, or it may take an alternate geometry, such as elliptical and other shapes, which can be more easily implemented in the context of the present invention since high precision of root end shape and dimensions is not required.

A number of variations and modifications of the invention can also be used. An interface of damping material between the composite material of the blade root, and the steel hub extension member can be provided. The ring devices can be provided with a variety or shapes, including elliptical, polygonal, and the like, and thus non-circular cross-section blade root ends can be accommodated. A number of modifications of the depicted load transfer device can be used. Webs 602a, 602b can be tapered, angled or flared. Two or more webs can extend between collars. Webs can extend from the collar of one ring to the collar of another ring. Collars of the rings can be joined or coupled. More than two rings can be provided if desired. The relative thickness of the webs 608a, 608b, can be adjusted as desired. Although said webs are depicted as substantially solid, the webs may be perforated, embossed, and/or non-planer. Although the present invention has been described in connection with a wind turbine blade, the invention can be used in a variety of different blades, including airplane propeller blades, water vessel propeller blades or screws, turbine blades, fan blades, and the like. Preferably, the load transfer device defines one or more substantial spaces 633, 634, 636, in the interior of the blade root end, over the axial extent 638, which the transfer device defines, with the spaces 633, 634, 636, either being hollow spaces or filled with a low-density material, having a density less than that of the load transfer devices 602a, 602b, such as a foam material. Preferably, at least about 50%, more preferably at least about 75%, of the volume between the blade root end wall 640, and the spindle 506 over the axial extent 638, defined by the load transfer device 602a, 602b, is such open space 633, 634, 636.

Although the invention has been defined by way of a preferred embodiment and certain variations and modifications, other variations and modifications can also be used, the invention being defined by the following claims:

What is claimed is:

1. In a rotatable blade of a wind turbine device for generation of electrical power, wherein said blade has a root end, apparatus for coupling said blade to a hub comprising:
at least the root end of said blade formed of a composite material, said root end being substantially hollow;
wherein said hub is metallic; and
means for transferring bending load from said blade to said hub in the absence of substantial concentration of stress leading to crushing of blade material.

2. Apparatus as claimed in claim 1, wherein said means comprises a first structure contacting an inner surface of said blade root end, over a first surface area thereof, and a second structure extending radially inward from said first structure.

3. Apparatus as claimed in claim 2, further comprising a third structure coupled to said second structure, and contacting a surface of a spindle coupled to said hub.

4. Apparatus, as claimed in claim 2 wherein said second structure is substantially washer-shaped.

5. Apparatus as claimed in claim 3, wherein said first, second and third structures define an H-shaped radial cross-section.

6. Apparatus as claimed in claim 1, wherein said means is configured such that, in response to a blade bending load, at least a first portion of said means is compressed in a direction having a first radial component.

7. Apparatus as claimed in claim 6, wherein in response to said bending load, a second portion of said means is compressed in a direction having a component parallel and opposite to said first radial component.

8. Apparatus as claimed in claim 7, wherein said first and second components are axially spaced an amount less than about five times a diameter of said blade root end.

9. Apparatus for use in connection with a rotatable blade of a wind turbine device for generation of electrical power, wherein said blade has a root end, said wind turbine device having a metallic hub which includes a spindle, the apparatus comprising:

a. at least the root end of said blade being formed of a composite material, said root end being hollow, and b. ring means contacting at least the majority of the inner circumference of said hollow root end along a first axial extent, and coupled to at least the majority of the outer circumference of said spindle, said spindle extending into said hollow root end along a second axial extent;

wherein said ring means comprises first and second rings spaced apart.

10. Apparatus as claimed in claim 9, wherein said first and second rings are spaced apart a distance about equal to a diameter of said root end.

* * * * *